UNITED STATES PATENT OFFICE.

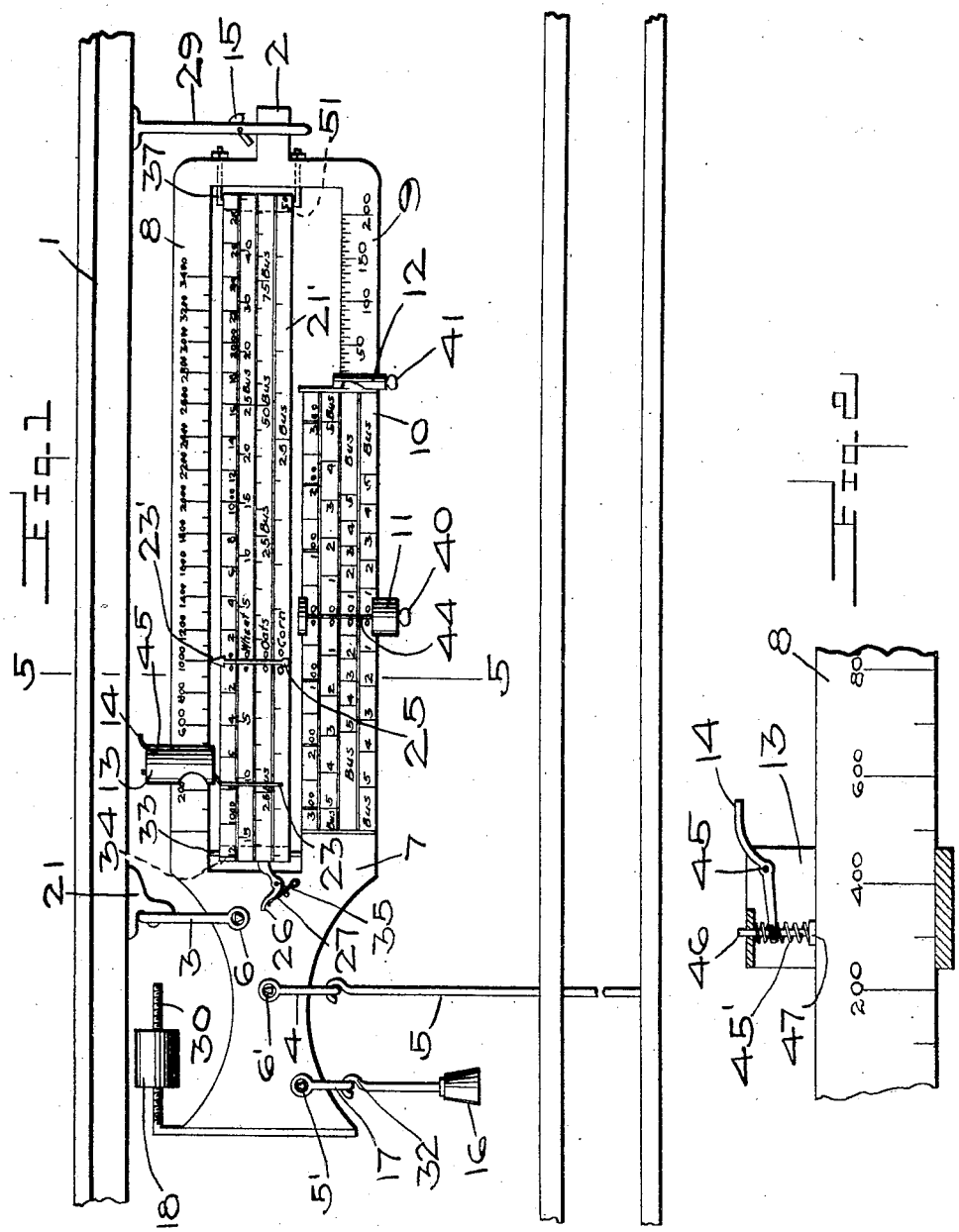

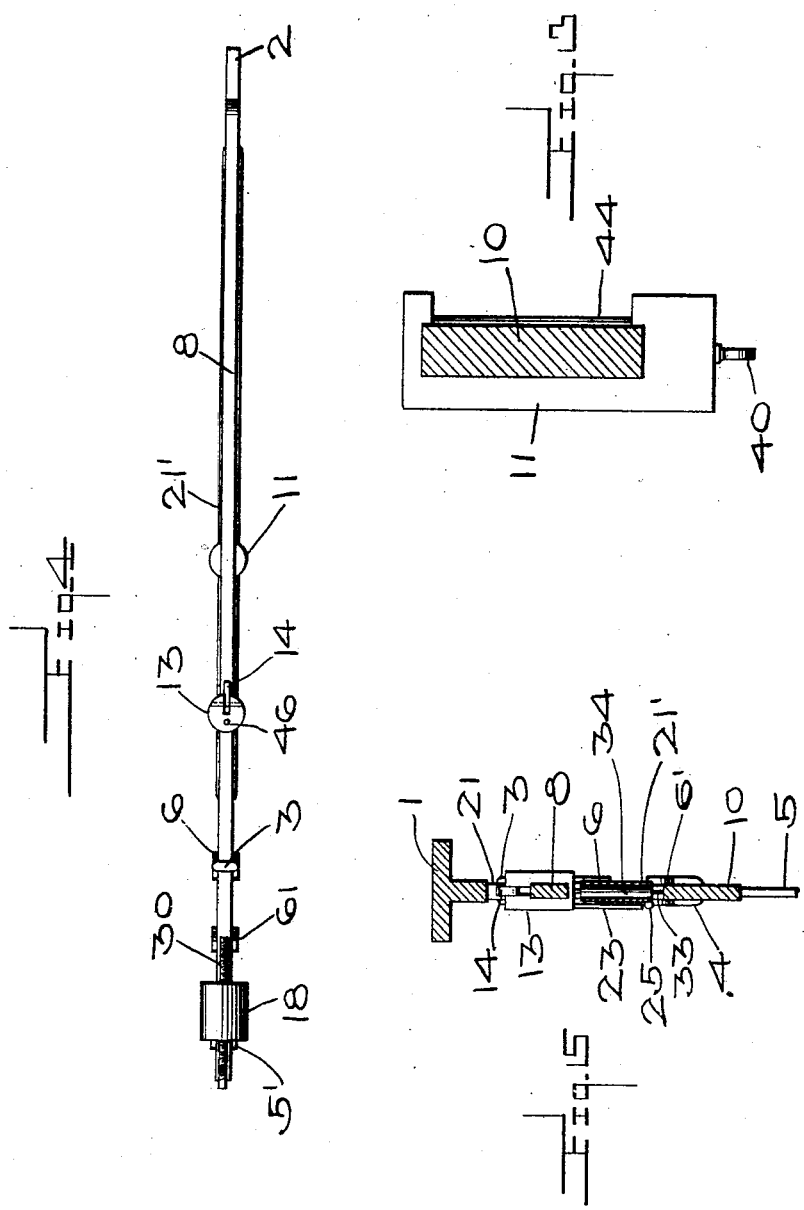

FRITZ M. CLAUSEN, OF GOLDFIELD, IOWA.

NET-WEIGHT SCALE-BEAM.

971,829.  Specification of Letters Patent.  Patented Oct. 4, 1910.

Application filed September 28, 1909. Serial No. 519,952.

*To all whom it may concern:*

Be it known that I, FRITZ M. CLAUSEN, a citizen of the United States, residing at Goldfield, in the county of Wright and State of Iowa, have invented certain new and useful Improvements in Net-Weight Scale-Beams, of which the following is a specification.

This invention has relation to certain new and useful improvements in computing scales, more particularly designed to be used in connection with scales in connection with grain elevators when goods are sold in a container.

A further object is to provide a scale which will indicate in bushels or in other predetermined units of measure the net weight of the commodity or material being weighed, in a manner accurately determining the tare.

Other objects and advantages will be apparent from the following description, and it will be understood that changes in specific structure shown and described may be made within the scope of the claims without departing from the spirit of the invention.

In the drawings forming a portion of this specification, and in which like numerals of reference indicate similar parts in the several views, Figure 1 shows a front elevation of a scale beam embodying my invention with portions broken away. Fig. 2 shows a large detached detail of the upper scale weight. Fig. 3 shows a detail of the lower major of the scale weight. Fig. 4 shows a top view of the scale beam. Fig. 5 is a section on line —5— Fig. 1.

The aim of my invention is to provide a scale so constructed that commodities within a container, (such as grain in a wagon) can be weighed in a manner insuring the tare being accurately determined to concisely give the net weight, at the end of the weighing operation.

In the accompanying drawings the numeral 1 designates the supporting housing or casing within which is secured the suspending hook 21. This hook 21 supports the clevis 3 which clevis in turn gives support to the main bearing 6 carried by the scale beam. The scale beam includes the head 7 and an arm provided with a longitudinally disposed slot to divide the scale beam into the upper bar 8 and a lower bar including the major scale section 10 and a minor scale section 9. The end of the scale beam is provided with the ear 2 held within the yoke 29 provided with the latch 15 so that the scale beam may be locked when desired.

Extending from the head 7 is the threaded bar 30 which adjustably supports the adjusting weight 18. This head 7 is further provided with the bearing 6′ carrying the clevis 4 from which extends the platform operating rod 5. The scale head 7 is further provided with the bearing 5′ supporting the clevis 17. This clevis 17 supports the hook 32 carrying the hollow or cup weight 16 which is filled with shot.

The upper scale bar 8 is provided with a graduation giving a pound reading. Slidably held upon the upper scale bar 8 is the poise scale weight 13 provided with the supporting pin 45 pivotally holding the lever 14, this weight 13 being slotted as shown. Carried at the end of the lever 14 is the stem 46 which at the lower end has a shoe 47 working upon the upper edge of the scale bar 8, this lever 14 being forced in one direction by means of the spring 45′. As shown the lever 14 projects beyond the scale weight 13 so that this weight can be readily shifted upon the bar 8. Extending downward from the weight 13 is an indicator 23.

The minor scale beam section 9 is provided with a scale graduation reading from zero to two hundred, and each graduation represents a unit of five pounds.

The major scale section 10, is provided with four superposed scale graduations, the upper graduations giving pound readings, while the three lower graduations give bushel readings. As shown this major scale section 10 starts in the center with zero and has two sets of graduations extending to the right and left. This major scale section is considerably longer and considerably wider than the minor scale section 9. Slidably held upon the minor scale section 9 is the scale weight 12 having the set screw 41, while slidably held upon the major scale section 10 is the slotted weight 11 having a set screw 40. Traversing the slot of this weight 11, is the reading or indicating wire 44 held in front of the major scale section 10.

Held between the arms of the scale beam, are the rollers 51′ and 34, the roller 51 being held upon the bracket 37, while the roller 34 is carried upon the pin 33. Held upon these rollers 51' and 34, is the endless tape or belt 21' having four separate scale graduations as shown. The uppermost graduation represents units of two hundred pounds each while the other graduations represent different weights of various grains as wheat, oats and corn. The graduation upon the endless tape reads to the right and left. The indicator 23 extending from the scale weight 13 is arranged for co-action with the tape graduation. The tape is provided with the indicator 23' arranged for coöperation with the scale upon the bar 8 while secured to the lower end of this indicator is the operating button 25 by means of which the tape is moved backward and forward.

Secured to the head 7 is the pivot pin 35 supporting the dog 26 normally forced against the ribbon by means of the spring 27. By means of this dog the ribbon or tape is held in an adjusted position.

The operation of my invention is as follows: When it is desired to weigh a load of grain such as corn the wagon or container is placed upon the platform of the scales and the scale weights 13 and 12 are moved out to the right until it communicates the motion of the platform to the scale beam. The reading will be in pounds for the gross weight of the load (grain and container). When the grain is dumped or unloaded the balance is destroyed. To find the net weight release the ribbon 21 by means of lock 26 and move it to the right by means of the knob 25 until the arrow 23' points to the weight indicated by weights 13 on bar 8. Let weight 12 remain. Move poise 13 on bar 8 to the left until the indicator 23 on said poise comes to one of the five bushel marks and which mark must show the total number of bushels to within five. Then move the poise 11 on scale 10 to the left until beam is in balance and the exact number of bushels are given. Should it be desired to load up a load of grain and find the net weight in bushels then find weight of wagon or container by poise 13 and 12. Place arrow 23' at point indicated by poise 13. Load up and balance by moving 11 and 13 to right. The indications of 23 and wire on poise 11 will give reading in bushels. The object is to be always able to start from "0" and move the poise either way. The beam is also adapted for weighing several loads repeatedly and then the sum altogether. This is accomplished by simply moving back poise 12 to "0" each time a load has been added and weighed, and balancing by poises 11 and 13.

The scale is simple and inexpensive in construction, and both durable and efficient in operation.

What is claimed is:

1. A scale beam including a head having an extending slotted arm to provide an upper and lower bar, each bar having scale graduations, the lower bar being divided into a major and a minor section, a supporting bearing carried by said head, a clevis engaging said bearing, a carrying bearing, a clevis secured to said carrying bearing, a platform rod secured to said carrying clevis, a threaded rod carried by said head, a scale weight upon said upper scale bar, a scale weight upon the major bar section, a scale weight upon said minor scale section, oppositely positioned rollers revolubly held between said bars, an endless graduated tape having scales thereon upon said rollers, an indicator carried by said tape, and an indicator extending from said first mentioned scale weight and adapted for coaction with the scales on the tape.

2. In combination, a scale beam including a head having an extending slotted arm to provide an upper and lower bar, each bar having scale graduations, said lower bar being divided into a major and a minor section, a supporting bearing carried by said head, a clevis secured to said supporting bearing, a carrying bearing secured to said head, a clevis secured to said carrying bearing, a connecting rod extending from said platform to said clevis, a scale weight upon said upper bar, a scale weight upon said minor scale section, a scale weight upon said major scale section, rollers revolubly held upon said bars, an endless graduated tape working over said rollers, an indicator extending from said first mentioned scale weight and adapted for coaction with the scales on the tape, and a dog carried by said head and locking against said tape.

3. A scale beam provided with suitable suspending means and including an upper and lower bar each bar having suitable scale graduation, said lower bar being divided into a major and a minor section, a scale weight upon said minor scale section, a scale weight upon said major section, rollers revolubly held between said bars, an endless tape held upon said rollers, an indicator carried by said tape for coöperation with a scale carried by said upper bar, a scale weight upon said upper bar and an indicator extending from said last mentioned scale weight for co-action with a series of scales upon said endless tape.

In testimony whereof I affix my signature, in presence of two witnesses.

FRITZ M. CLAUSEN.

Witnesses:
   W. H. MATHESON,
   M. S. OLSON.